United States Patent [19]

Kamimura et al.

[11] 4,377,829
[45] Mar. 22, 1983

[54] PLAYER FOR MAGNETIC TAPE CARTRIDGE RECORDINGS

[75] Inventors: Teturo Kamimura; Masahiro Komatsubara; Shizuo Ando; Takuzi Inanaga, all of Kawagoe, Japan

[73] Assignee: Pioneer Electronic Corporation, Tokyo, Japan

[21] Appl. No.: 220,982

[22] Filed: Dec. 29, 1980

[30] Foreign Application Priority Data

Dec. 29, 1979 [JP] Japan ............................. 54-171499
Dec. 29, 1979 [JP] Japan ............................. 54-171500

[51] Int. Cl.³ ................. G11B 15/66; G11B 15/26; G11B 23/04
[52] U.S. Cl. ................. 360/96.5; 242/199; 360/93; 360/96.6
[58] Field of Search ............ 360/96.5, 96.6, 96.1, 360/93, 137, 105; 242/197–200, 206, 208

[56] References Cited

U.S. PATENT DOCUMENTS

| | | | |
|---|---|---|---|
| 3,627,185 | 12/1971 | Trammell | 360/93 |
| 3,870,247 | 3/1975 | Carisey | 360/96.6 |
| 3,909,845 | 9/1975 | Rothlisberger | 360/93 |
| 3,950,787 | 4/1976 | Hosaka | 360/96.6 |
| 4,069,506 | 1/1978 | Ueno | 242/199 |
| 4,257,075 | 3/1981 | Wysocki et al. | 360/93 |

FOREIGN PATENT DOCUMENTS

55-122262 9/1980 Japan ............................. 360/96.5

Primary Examiner—Alfred H. Eddleman
Attorney, Agent, or Firm—Armstrong, Nikaido, Marmelstein & Kubovcik

[57] ABSTRACT

A player for magnetic tape recordings is provided, which comprises a cartridge holder adapted to receive therein a cartridge, guide grooves for guiding the holder, an ejecting member adapted to depress the holder and an ejecting mechanism for releasing the cartridge. The ejecting member is in the form of a lever. The ejecting mechanism serves to separate the lever from the holder with the advancement of the holder to retain the lever at an upper position separately from the cartridge holder, and to release the lever simultaneously with the starting of ejecting operation. Thus, the cartridge holder is pushed downward and ejected for removal. The player also includes two grooves intersecting each other at an angle of 90° to 180° on a line extending from the lever. These grooves serve to guide therealong both end of the ejecting lever to cause an arcuate movement of the lever.

14 Claims, 5 Drawing Figures

PLAYER FOR MAGNETIC TAPE CARTRIDGE RECORDINGS

BACKGROUND OF THE INVENTION

This invention relates to a player for magnetic tape cartridge recordings of the slot-in system, such as car stereophonic players, and more particularly to a player for magnetic tape cartridge recordings (hereinafter referred to as the tape player) wherein a cartridge holder is advanced aslant to receive a cartridge aslant, and then the front edge of the cartridge holder is elevated to position the received cartridge horizontally at the final stage of the cartridge receiving operation, and wherein an ejecting member is movable along an arc on the side of a chassis, thus causing the holder kept in a horizontal state to be pushed down for ejection.

SUMMARY OF THE INVENTION

An object of the present invention is to provide a tape player capable of quickly and surely ejecting a cartridge without interferring with the forward movement and the upward movement of the holder in cartridge ejecting operation.

Another object of the present invention is to provide a tape player having a compact ejector mechanism which assures to cause an arcuate movement of an ejecting member through two guide grooves formed on the side of a chassis with no need of provision of any point of rotation.

BRIEF DESCRIPTION OF THE DRAWINGS

Other objects and advantages of the present invention will become apparent from a reading of the following detailed description in conjunction with the accompanying drawings in which.

DETAILED DESCRIPTION OF THE EMBODIMENTS

Figure 1:
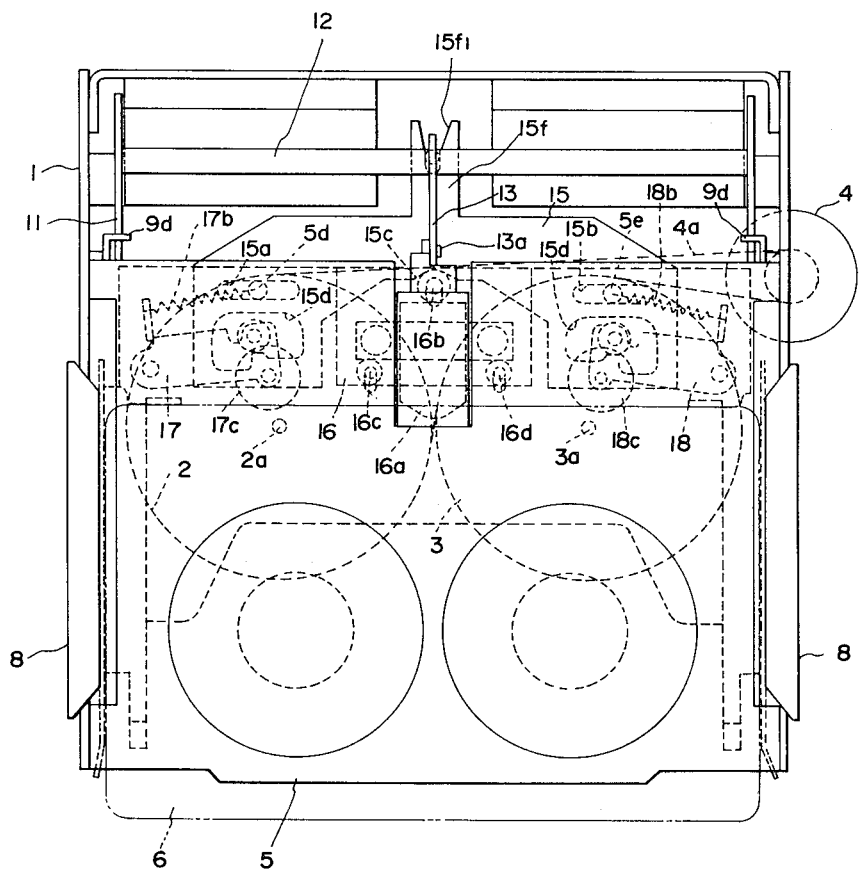
FIG. 1 is a plan view of one embodiment of the present invention.

A chassis 1 is constructed in the form of a housing. Capstan shafts 2a and 3a of flywheels 2 and 3 respectively are symmetrically journalled in a mounting plate, not shown, disposed within the chassis 1. A motor 4 is affixed to the chassis 1 and is connected by a belt 4a to the flywheels 2 and 3. A cartridge holder 5 for accepting a tape cartridge 6 from outside the chassis into the same is provided, on each of opposite vertical sides facing the chassis 1, with three guide rollers 5a, 5b and 5c. The guide rollers 5a and 5b are fitted in L-shaped guide grooves 1a and 1b formed on each vertical side wall of the chassis 1 respectively. Each L-shaped guide groove has a horizontal guide portion and an ascending guide portion. The guide roller 5c is fitted in a guide groove 7a formed on a pressing plate 7 of which will be described afterward. The cartridge holder 5 is guided aslant with respect to the chassis 1 and is aligned horizontally when the guide rollers 5a and 5b reach the upper most ends of the respective guide grooves 1a and 1b. The pressing plate 7 pivoted on the side wall of the chassis 1 at one end is continuously urged by a spring 7b in the direction to close the cartridge holder 5, i.e. in the counterclockwise direction in FIG. 2. A guide groove $7a_1$ is formed on an extension 7a of the pressing plate 7.

Figure 2:
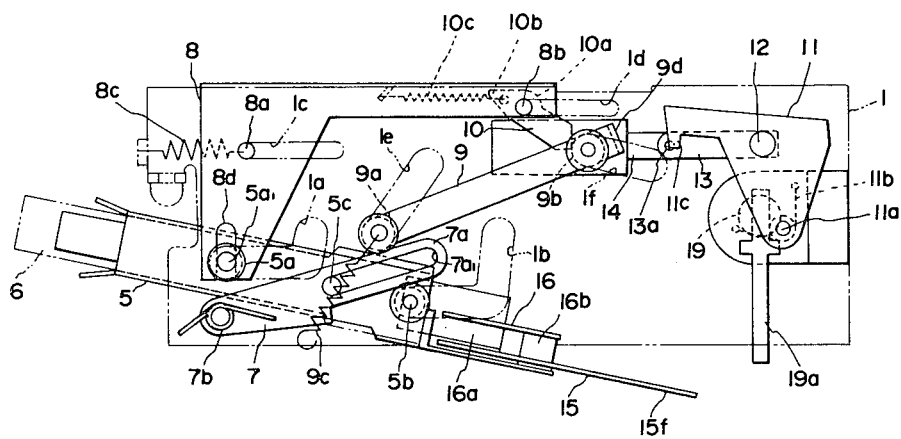
FIGS. 2 to 4 are sectional views of the embodiment.
Figure 4:
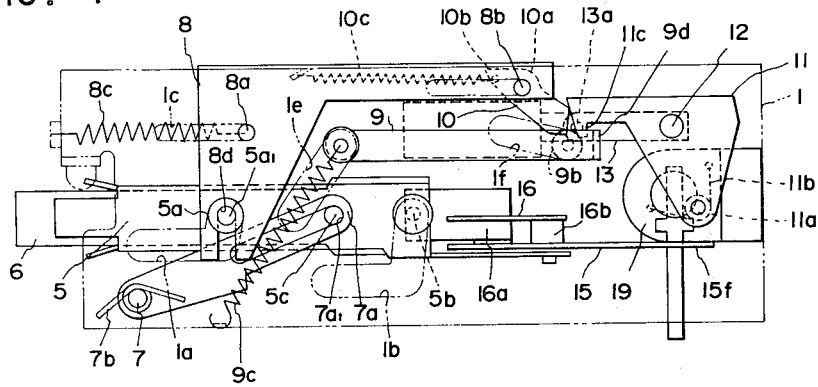

Guide pins 8a and 8b affixed to a sliding plate 8 provided in a horizontally sliding engagement with the chassis are fitted in guide grooves 1c and 1b formed on the side wall of the chassis 1 respectively and are allowed to move forward and rearward, rightward and leftward in FIG. 2, along the side wall of the chassis 1. The sliding plate 8 is urged by a spring 8c extended between the chassis 1 and the guide pin 8a in the direction to eject the cartridge holder 5 toward outside the player, i.e., leftward in FIG. 2. A vertical guide groove 8d is formed on the sliding plate 8 to guide the shaft $5a_1$ of the guide roller 5a, therefore, the sliding plate 8 is allowed to advance with the forward movement of the cartridge holder 5. In other words, sliding plate 8 is in vertically sliding engagement with cartridge holder 5. An ejecting lever 9 is provided on opposite ends thereof with guide rollers 9a and 9b which are guided by guide grooves 1e and 1f formed on the side wall of the chassis 1 with an angular relationship of 120° to each other so as to allow the ejecting lever to perform approximately an arcuate movement. This arcuate movement is accomplished provided that said angular relationship is within the range of 90° to 180°. The guide roller 9a is in contact with the upper surface of the leading end of the cartridge holder 5 and is urged by a spring 9c so as to depress the leading end of the cartridge holder 5 to maintain its oblique position. A pawl 10 is pivotally mounted on the guide pin 8b and is allowed to turn in the counterclockwise direction within the arcuate range 10a whereas the turning in the clockwise direction is restricted by contact between a stopping face 10b and the upper rim of the sliding plate 8. A stopper plate 11 pivotally mounted on the chassis 1 by means of a pivot 11a is urged in the clockwise direction by a spring 11b. The left and right stopper plate 11 are coupled by a coupling rod 12 as shown in FIGS. 1 and 2. A connecting lever 13 is rotatably joined with the coupling rod 12 at the center part of the coupling rod 12 and is connected at its front end to a plunger 14 of a solenoid by means of a pin 13a. The front end portion of the stopper plate 11 is formed in a hook 11c which engages with a bend 9d (FIG. 1) with the ejecting lever 9 as illustrated in FIG. 4. Guide pins 5d and 5e are affixed to the extending part of the cartridge holder 5. The guide pins 5d and 5e are guided by guide grooves 15a and 15b respectively of a cam plate 15 so as to guide the transverse movement of the cam plate 15 in FIGS. 1 and 5. A reproducing head 16a is attached to a head mount 16 provided with three guide pins 16b, 16c and 16d directing downward which are guided by guide grooves 5f, 5g and 5h formed on the extending part of the cartridge holder 5 at a leading end thereof. A cam roller 16e mounted on the guide pin 16b is pressed against a cam surface 15e of the cam plate 15 by a spring 16f. Pinch roller holders 17 and 18 are rotatably attached to the cartridge holder 5 by means of pivots 17a and 18a respectively. Said pinch roller holders carry free running pinch rollers thereon and are urged by springs 17b and 18b so as to push the pinch rollers 17c and 18c against the capstan shafts 2a and 3a respectively. Cam rollers 17d and 18d attached to pinch roller holders 17 and 18 are engaged with cam holes 15d and 15e symmetrically formed on the cam plate 15 respectively. The cam holes 15d and 15e comprise raised cam faces $15d_1$ and $15e_1$, intermediate cam faces $15d_2$ and $15e_2$, and recessed cam faces $15d_3$ and $15e_3$ respectively. With the movement of the cam plate 15, the cam rollers 17d and 18d selectively come in contact with those cam faces so that the distance between the pinch rollers 17c and 18c and the capstan shafts 2a and 3a respectively. From the central part of the rear end of the cam plate 15 is projecting an extension 15f having a slot 15f₁ which is adapted to engage with a pendent pin 19a of a plunger 19 as the cartridge holder 5 moves from the oblique position to the horizontal position.

Figure 3:
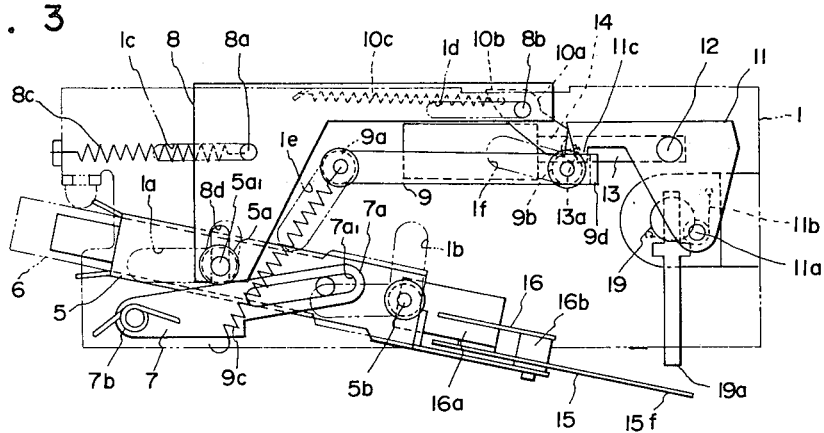

Operation of the mechanism will be described according to the above-mentioned construction. When a cartridge 6 is inserted in the cartridge holder 5 with the opening in front, and then pushed, the cartridge holder 5 is moved parallel from the position of FIG. 2 to the position of FIG. 3 keeping the same inclination as the guide rollers 5a and 5b are guided along the holizontal parts of the guide grooves 1a and 1b and the guide groove 7a₁ of the pressing plate 7. The sliding plate 8 is advanced with the horizontal movement of the cartridge holder 5 as the shaft 5a₁ of the guide roller 5a is fitted in the guide groove 8d of the sliding plate 8. The pawl 10 is pivotally fitted on the front guide pin 8b of the sliding plate 8 and the nose is put to the guide roller 9b of the ejecting lever 9 as shown in FIG. 2, therefore, the pawl 10 pushes the guide roller 9b toward the stopper plate 11 with the advancement of the sliding plate 8 and finally, the ejecting lever 9 is forced to move against the spring 9c to the position shown in FIG. 3 along a locus of a circular arc. When the movement of the ejecting lever 9 has been completed, the stopper plate 11 which has been turned to the position shown in FIG. 2 by the spring 11b is turned in the counterclockwise direction by the action of the plunger 14 through the connecting lever 13 and the coupling rod 12 so that the hook 11c of the stopper plate 11 engages with the bend 9d of the ejecting lever 9 to retain the ejecting lever 9 at the position shown in FIG. 3. The guide roller 9b moves downward with respect to the pawl 10 with its rightward advancement as the guide groove 1f by which the guide roller 9b is guided is declined in the direction of advancement of the guide roller 9b, however, the hook 11c engages with the bend 9d of the ejecting lever 9 before the guide roller 9b escapes from the pawl 10 as hereinafter described. When the guide rollers 5a and 5b have reached the respective ends of the horizontal portions of the guide grooves 1a and 1b respectively, the guide rollers 5a and 5b of the cartridge holder 5 are urged into the vertical portions of the guide grooves 1a and 1b respectively as the cartridge holder 5 is continuously pushed upward by the spring force of the spring 7b applied to the pressing plate 7 and the guide roller 9a which has been depressing the cartridge holder 5 has already been moved upward. Accordingly, the cartridge holder 5 is allowed to turn slightly from the slanted state shown in FIG. 3 to the horizontal state shown in FIG. 4 while the ejecting lever 9 is retained above said horizontal position. Thus when the cartridge holder 5 has been set in the horizontal position, the capstan shafts 2a and 3a are in alighment with the corresponding holes on the cartridge 6, therefore the cartridge 6 does not interfer with the capstan shafts 2a and 3a during its shift to the horizontal position allowing the capstan shafts 2a and 3a to accurately fit in the capstan shaft receiving holes on the cartridge 6. The cartridge holder 5 moves slightly forward (rightward in FIG. 3 or 4) during its transition from the slanted position shown in FIG. 3 to the horizontal position shown in FIG. 4 as the vertical portions of the guide grooves 1a and 1b are slightly inclined in the clockwise direction.

Thus the capstan shafts 2a and 3a are accurately aligned with the respective centers of the capstan shaft receiving holes on the cartridge 6 when the cartridge holder 5 has been moved to the horizontal state. The sliding plate 8 and the pawl 10 also are advanced with the advancement of the cartridge holder 5 during the transition of the cartridge holder 5 from the slanted position to the horizontal position whereby the pawl 10 pushes the guide roller 9b of the ejecting lever 9 so that the guide roller 9b is made to move further forward as well as downward, and finally, the pawl 10 rides over the guide roller 9b. When the cartridge has been disposed horizontally through the process as hereinbefore described, reel shafts, not shown, descend and fit in the corresponding reel hubs of the cartridge 6 in the manner as described in detail in Japanese patent application No. 62908/79. During the transition of the cartridge holder 5 from the slanted position to the horizontal position, the extension 15f of the cam plate 15 approaches the pendent pin 19a of the plunger 19 diagonally from under the pendent pin 19a, and when the cartridge holder 5 has been perfectly aligned in the horizontal position, the slot 15f₁ of the extension 15 engages with the pendent pin 19a as shown by long and two short dashes lines in FIGS. 4 and 5, thus completing the setting of the cartridge 6. At the completion of the setting of the cartridge 6, the head 16a has already been positioned at the REW-or FF-position, being inserted into the opening of the cartridge 6 as shown in FIG. 1. At this position, the head 16a lightly contacts the tape surface such that non-recorded areas between musical performances are detected during rewinding or fast forward winding.

Figure 5:
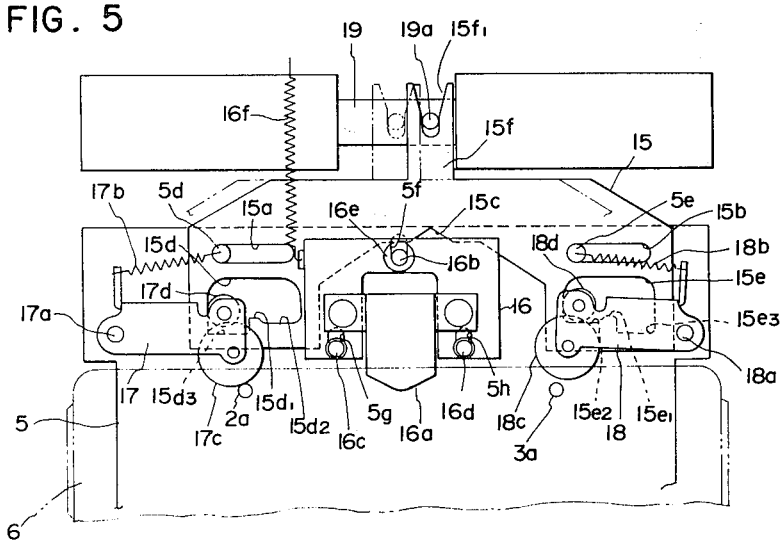
FIG. 5 is a partially plan view of the embodiment.

Referring to FIG. 5, in reproducing the records by driving the tape from the right to the left, the solenoid is energized to shift the plunger 19 from the position shown by the phantom lines to the position shown by the continuous lines. With the shifting of the plunger 19, the cam plate is moved rightward through the pendent pin 19a and the extension 15f. With the movement of the cam plate 15, the cam face 15c pushes the cam roller 16e causing the head mount 16, that is the reproducing head 16a, to be pushed against the tape surface. On the other hand, with the rightward movement of the cam plate 15, the cam rollers 17d and 18d of the pinch roller holders 17 and 18 respectively are moved from the raised cam faces 15d₁ and 15e₁ of the cam holes 15d and 15e to the recessed cam face 15d₃ and the intermediate cam face 15e₂ respectively. With the movement of the cam roller 17d to the recessed cam face 15d₃, the pinch roller holder 17 is allowed to turn slightly in the clockwise direction under the action of the spring 17b. The recessed cam face 15d₃ is recessed deep enough to allow the pinch roller 17c to be pressed against the capstan shaft 2a before the cam roller 17d come in contact with the recessed cam face 15d₃. With the movement of the cam roller 18a to the intermediate cam face 15e₂, the pinch roller 18 is allowed to turn slightly in the counterclockwise direction under the action of the spring 18b. The intermediate cam face 15e₂ is so formed that the cam roller 18d comes in contact with the intermediate cam face 15e₂ before the pinch roller 18c comes in contact with the capstan shaft 3a so that the pinch roller 18c is stopped with a small gap between the pinch roller 18c and the capstan shaft 3a (FIG. 5). Thus, with the movement of the cam plate 15, the reproducing head 16a and the pinch rollers 17c and 18c are simultaneously advanced and set to the respective operating positions, and then the tape is driven leftward and the reproducing of the records is started by supplying electricity to the motor 4. In reproducing the records by driving the tape rightward, the cam plate 15 is shifted to the left, then the component members operate in the opposite directions with respect to the directions as hereinbefore described referring to the case when the cam plate 15 is shifted to the right, however, detailed description will be omitted to avoid duplication.

The cartridge ejecting operation will be described hereunder. When an eject lever, not shown, is operated, first the solenoid is energized to actuate the plunger 19 which returns the cam plate 15 to the neutral position so that the reproducing head 16a and the pinch rollers 17c and 18c are retracted. When the solenoid including the the plunger 14 is unenergized, the stopper plate 11 is turned in the clockwise direction by the action of the spring 11b so that the hook 11c and the bend 9d of the ejecting lever 9 are disengaged. At the beginning of this disengagement when the component members are arranged as shown in FIG. 4, the guide roller 9b of the ejecting lever 9 is separated from the pawl 10, therefore, when the bend 9d is released from the hook 11c, the ejecting lever 9 is allowed to move from the position of FIG. 3 to that of FIG. 2 under the action of the expansion spring 9c. During this movement of the ejecting lever 9, the guide roller 9a pushes down the cartridge holder 5 against the lifting force of the pressing plate 7 so that the guide rollers 5a and 5b are pushed down along the respective vertical portions of the guide grooves 1a and 1b formed on the chassis 1 respectively and the cartridge holder 5 is moved to the slanted position. When the guide rollers 5a and 5b of the cartridge holder 5 have reached the lower most parts of the respective guide grooves 1a and 1b, the cartridge holder 5 is pulled by the spring 8c through the guide pin 8a, the sliding plate 8, the guide groove 8d, the shaft 5a₁ of the guide roller 5a in the ejecting direction, i.e. to the left in FIG. 3, consequently, the guide rollers 5a and 5b move along the horizontal positions of the guide grooves 1a and 1b respectively leftward thus ejecting the cartridge holder 5 as shown in FIG. 2 and facilitating the replacement of the cartridge 6. During the leftward movement of the pawl 10 together with the leftward movement of the sliding plate 8, the pawl 10 rides over the guide roller 9b as it is turned in the counterclockwise direction against the action of the spring 10c as the guide roller 9b of the ejecting lever 9 has previously been returned to the left side position. Finally, the pawl 10 is restored to the position shown in FIG. 2.

It will be well understood from what has been described hereinbefore that, according to the present invention, the upward movement of the cartridge holder is effected smoothly without any obstruction as the ejecting member is separated upward from the cartridge holder with the advancement of the cartridge holder in setting the cartridge to the tape player, is retained at this position until the ejecting operation is started, and is released at the beginning of the ejecting operation to depress the cartridge holder downward, thus ensuring quick and accurate cartridge ejecting operation. In addition, the ejecting lever is guided at both its ends along two guide grooves designed to intersect each other at an angle of 90° to 180° on a line extending from the lever. This causes an substantially arcuate movement of the lever, thus assuring smooth and reliable operation thereof. Such an arcuate movement of the lever may be effected with a lever having a pivotal point. When this movement takes place along a large radius of curvature, however, it is required to increase the length of the lever and locate the pivotal point at a distant position, with the result that the production of a small-sized player is impossible. The present invention is free from the above-mentioned problem, and makes it possible to obtain a compact or small-sized tape player.

What is claimed is:

1. In a player for magnetic tape cartridge recording and playback operation comprising:
    a chassis having a main surface;
    a cartridge holder mounted for motion within said chassis and adapted to receive a tape cartridge from without said chassis at an initial oblique position with respect to the main surface; and
    guide means associated with said cartridge holder and including at least one set of guide grooves, each including a first groove portion parallel to the main surfaces and a second groove portion extending from the first groove portion substantially perpendicularly thereto, said guide means allowing said cartridge holder to be translated into said chassis to an intermediate oblique position along the first groove portion and then turned from the intermediate oblique position to a position parallel to the main surface;
    the improvement comprising:
    ejecting means for urging said cartridge holder from the parallel position back to the intermediate oblique position along the second groove portion and further to the initial position along the first groove portion; and
    control means for selectively retaining said ejecting means inoperative in response to the translational movement of said cartridge holder into the chassis.

2. The player according to claim 1 wherein said ejecting means comprises:
    first ejecting means for urging said cartridge holder from the parallel position back to the intermediate oblique position along the second groove position; and
    second ejecting means for urging said cartridge holder from the intermediate oblique position to the initial position along the first groove portion.

3. The player according to claim 2 wherein said control means comprises:
    first control means for selectively retaining said first ejecting means inoperative; and
    second control means comprising said second groove portion for retaining said second ejecting means inoperative.

4. The player according to claim 2 wherein said first ejecting means includes an ejecting lever having one end engageable with said cartridge holder, and a spring extended between said chassis and said ejecting lever to bias said ejecting lever in engagement with said cartridge holder to urge said cartridge holder from the parallel position back to the intermediate position.

5. The player according to claim 2 wherein said second ejecting means includes a sliding plate mounted in said chassis for movement parallel to the main surface and engaged with said cartridge holder, and a spring extended between said chassis and said sliding plate to urge said cartridge holder from the intermediate position to the initial position.

6. The player according to claim 1 wherein said ejecting means comprises:

first ejecting means including an ejecting lever having one end engageable with said cartridge holder, and a spring extended between said chassis and said ejecting lever to bias said ejecting lever in engagement with said cartridge holder to urge said cartridge holder from the parallel position back to the intermediate position, and second ejecting means including a sliding plate mounted in said chassis for movement parallel to the main surface and engaged with said cartridge holder, and a spring extended between said chassis and said sliding plate to urge said cartridge holder from the intermediate position to the initial position;

said control means comprises:

first control means for selectively retaining said first ejecting means inoperative; and second control means comprising said second groove portion for retaining said second ejecting means inoperative.

7. The player according to claim 6 wherein said first control means comprises a stopper plate pivotally mounted on the chassis and biased in a predetermined direction, and means for bringing said ejecting lever into engagement with said stopper plate.

8. The player according to claim 7 wherein said last-mentioned means comprises said sliding plate, and a pawl pivotally connected to said sliding plate and engageable with the other end of said ejecting lever.

9. The player according to claim 4 or 6 wherein said chassis includes a pair of guide channels on a side wall thereof, one guide channel being at an angle of more than 90° and less than 180° with respect to the other guide channel, and said ejecting lever has at opposite ends guide rollers which are received in said guide channels to allow substantially arcuate movement of said ejecting lever.

10. The player according to claim 7 wherein said first control means further comprises a plunger which is electrically actuated to disengage said stopper plate from said ejecting lever.

11. The player according to claim 8 wherein said sliding plate has two pins which are received in guide slots formed in the side wall of said chassis parallel to the main surface.

12. The player according to claim 8 wherein said pawl is spring biased such that the pawl is disengaged from the other end of said ejecting lever when said sliding plate has been moved with the translational movement of said cartridge holder.

13. The player according to claim 6 wherein a member on the side wall of said cartridge holder is received in a slot in said sliding plate to engage said cartridge holder with said sliding plate.

14. The player according to claim 13 wherein said guide means includes two sets of guide grooves formed in opposite side walls of said chassis and two sets of guide members affixed to opposite side walls of said cartridge holder and received in the corresponding guide grooves, and said member is one of said guide members.

* * * * *